United States Patent Office 3,385,318
Patented May 28, 1968

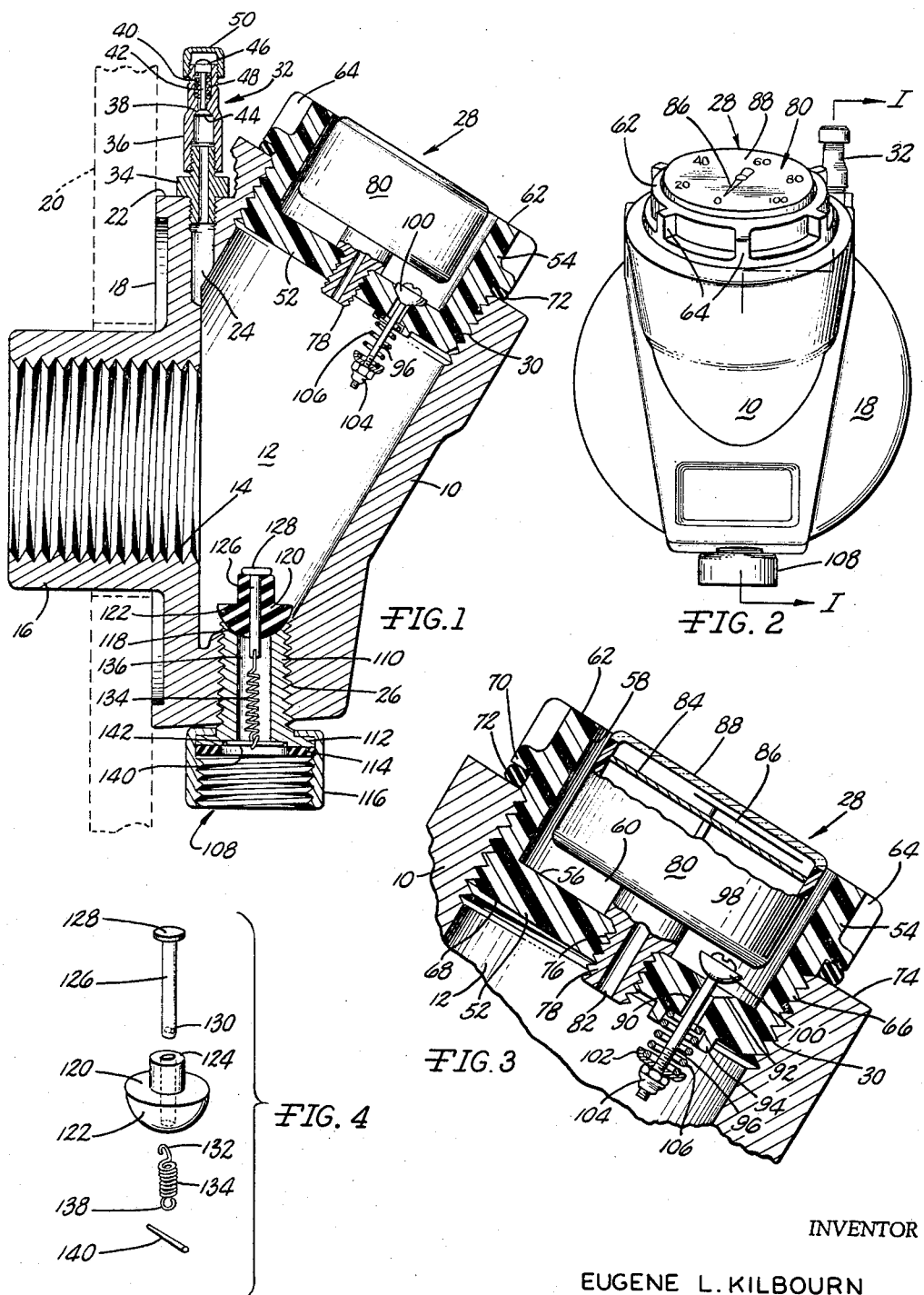

3,385,318
INLET FITTING FOR PRESSURIZED
FLUID SYSTEMS
Eugene L. Kilbourn, Marshall, Mich., assignor to Progressive Dynamics, Inc., Marshall, Mich., a corporation of Michigan
Filed Dec. 16, 1965, Ser. No. 514,217
6 Claims. (Cl. 137—557)

ABSTRACT OF THE DISCLOSURE

An inlet fitting for pressurized fluid systems utilizing a removable cap having a pressure gauge incorporated therein whereby the gauge is readily viewed and is protected by the cap. Additionally, a simplified check valve is employed with the fitting and a pressure relief valve is mounted in the cap.

---

A basic object of the invention is to provide an inlet fitting for pressurized water systems wherein the fitting provides the support and mounting means for the necessary appliances required with a pressurized system. Thus, the fitting in accord with the invention has associted therewith a pressure relief valve, a pressurizing valve, a pressurized water inlet and check valve assembly and a gauge to indicate the pressure within the system.

Another object of the invention is to provide an inlet fitting for pressurized water systems which is of an attractive and utilitarian appearance and configuration and may be mounted upon the exterior of the structure employing the fluid system without unduly extending from the structure configuration.

A further object of the invention is to provide an inlet fitting for pressurized water systems wherein water may be easily poured into the fitting and wherein the pressurizing valve and the pressurized fluid inlet are readily accessible.

Another object of the invention is to provide an inlet fitting for pressurized water systems having a removable cap threaded upon the fitting inlet wherein the cap contains a pressure gauge, the gauge being so related to the cap that the cap protects the gauge from damage, and the fitting inlet being so disposed to the fitting mounting means that reading of the gauge face is easily accomplished.

An additional object of the invention is to provide an inlet fitting for pressurized water systems wherein the fitting includes an inlet adapted to be closed by a removable cap and wherein the cap contains a pressure gauge and a pressure relief safety valve. The gauge is so mounted upon the cap that the relief valve is not visible when the cap is closing the fitting inlet and the relief valve is of such a construction as not to be easily damaged or rendered inoperative due to corrosion or foreign matter entering the relief valve operating parts.

Another object of the invention is to provide a check valve assembly for use with a pressurized fluid inlet which is of a simplified nature and substantially free of malfunctioning problems. The assembly of the check valve may be made to conventional hose fittings and requires no modification thereto. Also, the check valve installation does not require interior guide or spring anchoring means other than the fitting component with which it is directly associated.

Yet another object of the invention is to provide a cap for an inlet fitting for pressurized water systems which supports and protects a pressure gauge from damage and permits the gauge to be readily observed, and provides an attractive and high quality appearance.

These and other objects of the invention arising from the details and relationships of the components of an embodiment thereof will be apparent from the following description and accompanying drawings wherein:

FIG. 1 is an elevational, sectional view of an inlet fitting in accord with the invention, as taken along section I—I of FIG. 2, FIG. 2 is a front elevational view of the inlet fitting of the invention, FIG. 3 is an enlarged, diametrical, sectional view of the inlet fitting cap of the invention illustrating the pressure relief valve in the open position as would occur during the relief of pressure within the system, and FIG. 4 is an exploded perspective view of the components of the check valve utilized with the pressurized water inlet fitting.

The inlet fitting of the invention includes a hollow body which is preferably of a cast construction, and may be cast of a metallic material such as aluminum, as in the illustrated embodiment, or the body could be cast of a nonmetallic synthetic material, if desired. The body includes a cylindrical chamber 12 which is obliquely related to an intersecting threaded bore 14 defined in the body boss 16. The threads of bore 14 are preferably pipe threads whereby the fitting body may be threaded upon a conventional water pipe, not shown, of the fluid system with which the fitting is employed. The pipe upon which the boss 16 is threaded will constitute the support means for the fitting, and the bore 14 comprises the outlet of the fitting. The body is provided with a generally circular flange 18 which is adapted to abut against an exterior trailer wall or surface 20, as shown in dotted lines in FIG. 1.

The body 10 is formed with a shoulder portion 22 at its upper region and a bore 24 extends therethrough communicating with the chamber 12. Bore 24 is threaded adjacent the exterior surface of the shoulder for receiving the pressurizing fitting, as will be later described. A threaded bore 26 is also defined at the lower region of the body 10 communicating with the chamber 12 into which the pressurized fluid inlet fitting may be threaded. To permit the cap 28 to be mounted upon the body 10, the chamber 12 is threaded at 30 at its inlet whereby the cap 28 having corresponding threads mounted thereon may be used to seal the body chamber inlet.

In order to permit air to be injected or pumped into the system to build up the air pressure acting upon the fluid contained in the reservoir tank, which is usually a part of a pressurized water system, a pressurizing fitting generally indicated at 32 is mounted upon the body 10 in communication with the interior chamber thereof. The fitting 32 includes a base fitting portion 34 threaded at each end and having a bore extending therethrough. The lower threaded portion thereof is threaded into the threads of bore 24. A valved fitting portion 36 is threaded upon the portion 32 and is provided with a bore therethrough including a conical seat 38 and a spring-receiving shouldered recess 40. A poppet-type valve 42 is reciprocally mounted within the bore of the fitting portion 36 and includes a valve head 44 adapted to sealingly engage the seat 38. An enlarged end 46 received within the upper end of the recess 40 is exteriorly accessible and serves as an anchor for the compression spring 48 received within the recess 40. Thus, the spring 48 biases the valve head 44 in engagement with the valve seat 38. A threaded cap 50 may be threaded upon the upper end of the fitting portion 36 to protect the enlarged end 46 from being accidentally depressed. When it is desired to inject pressurized air into the inlet fitting body, the compressed air chuck, or the threaded outlet end of an air pump, is mounted upon the upper end of the fitting portion 36 and, in the normal manner, such compressed air sources include a depressor for engaging end 46 and depressing the valve to permit compressed air to enter the fitting 32 and chamber 12. Should an excessive pressure exist within the chamber 12, such pressure may be manually reduced by depressing the valve end 46 manually and permitting compressed air to escape from the fitting.

The body inlet is closed or sealed by the cap 28. The cap 28, in the illustrated embodiment, is formed of a non-metallic synthetic material such as nylon or Delrin and may be of a molded construction. The cap is of a generally cup-like configuration consisting of a base portion 52 and an annular wall portion 54. The base portion 52 includes an "upper" surface 56 which intersects the cylindrical inner wall surface 58 to define a recess or chamber 60 in the cap which is exteriorly accessible and observable when the cap is mounted within and seals the body fitting inlet. The axially extending wall portion 54 terminates in an annular ridge or edge 62 and a plurality of radially extending ribs 64 are preferably formed in the exterior portion of the cap adjacent the edge 62 to facilitate rotation of the cap by the fingers. Threads 66 defined upon the cap mate with the threads 30 defined in the body inlet and an inner surface 68 is defined on the cap parallel to the recess surface 56. An annular ridge 70 circumscribes the cap wall 54 forming a shoulder which positions a resilient O-ring 72 which is compressed between the ridge and surface 74 of the body when the cap is fully tightened into the body inlet opening.

The cap base portion is centrally bored and threaded at 76 to receive the threaded mounting stem 78 of an air pressure gauge 80. The mounting stem 78 includes a passage 82 intersecting the end of the stem permitting the gauge to communicate with the interior of the body, as will be apparent from FIG. 1. The air pressure gauge includes a face 84 which is disposed substantially parallel to the cap edge 62 and a pressure indicating needle 86 disposed adjacent the face indicates the pressure conditions within the body 10 by means of the usual indicia printed upon the gauge face. A transparent window 88 extends over the gauge face and indicating needle. Preferably, the gauge 80 is of the type manufactured by the U.S. Gauge Company having a plastic synthetic material case which includes the window 88 as an integral and homogenous part of the case. The diameter of the gauge casing is slightly less than that of the diameter of the cap recess 60 wherein a radial clearance exists between the pressure gauge casing and the surface 58 whereby air bled from the pressure relief valve may escape around the gauge and into the atmosphere. The recess is formed of such depth that the pressure gauge 60 is substantially completely received therein such that the cap 28 will protect the pressure gauge against damage. As is apparent from FIGS. 1 and 3, the cap edge 62 is in substantial alignment with the window portion of the gauge as the gauge window extends only slightly beyond the edge and, thus, the gauge is susceptible to damage only with respect to objects approaching the gauge window directly. The aforedescribed relationship between the cap and gauge causes the gauge to have a unitary appearance with the cap providing a pleasing and "custom-built" appearance.

The cap base portion 52 is provided with a bore 90 which intersects the recess bottom surface 56 in a countersunk manner to define a valve seat 92. An annular spring guide and retainer projection 94 is defined on the cap base extending from the lower surface 68 concentric to the bore 90. A threaded valve stem 96 is inserted through the bore 90, and the valve stem is considerably smaller in diameter than the bore 90 wherein foreign matter within the bore will not "freeze" or corrode the stem to the cap. The valve stem 96 is provided with a head 98 and a resilient valve head 100 bears against the head 98 for sealing engagement with the valve seat 92. Preferably, the stem is formed by a machine screw and the head 98 comprises the head of the screw. A spring retainer washer 102 and nut 104 are mounted upon the threaded end of the valve stem 96, and permit adjustment of the degree of biasing force provided by the compression spring 106 interposed between the spring retainer 94 and the spring retainer washer 102. Tightening of the nut 104 upon the valve stem increases the "blow-off" pressure of the cap release valve and unless the air pressure within the fluid system becomes excessive, the spring 106 will maintain the resilient valve head 100 in sealing engagement with the valve seat 92, as shown in FIG. 1.

Due to the clearance between the valve stem 96 and the bore 90 and the shape of head 100, the head 100 makes a positive seal with seat 92 without the necessity of a stem bearing, and it is possible to tilt the stem within the bore. In this manner the fact that the valve stem is "free" within the bore 90 may be checked and the possibility of the pressure relief valve becoming inoperative due to corrosion or fouling is minimized.

It is to be noted that enough clearance exists between the recess surface 58 and the underside of the guage 80 to permit the valve 100 to be lifted from the valve seat 92, as shown in FIG. 3, and, thus, the gauge will not interfere with the safety relief valve operation. However, the gauge 80 will conceal the valve stem head and valve head from view, and the relief valve will not detract from the exterior appearance of the inlet fitting.

Pressurized water may be introduced into the fitting body 10 through the fitting 108. Normally, such pressurized water would be that supplied from a hose connected to a house or service station water source. The fitting 108 is of a conventional construction for a female hose fitting and includes a tubular threaded stem 110 having an enlarged radially extending head 112. The head 112 includes a radial shoulder upon which an annular resilient washer 114 may be disposed. A swivel nut 116 is rotatably mounted upon the head 112 having a portion flanged over the head to maintain the nut upon the stem. The nut 116 is interiorly threaded for cooperation with the male end of a conventional lawn or garden hose. If desired, a dust cap, not shown may be employed to snap over the nut 116 when the fitting 108 is not in use.

The inner end of the stem 110 is formed with a conical surface 118 which constitutes the valve seat of the check valve structure. The check valve comprises a resilient valve head member 120 formed of rubber, or the like, having a longitudinal bore extending therethrough. The valve head 120 is formed with a convex surface 122 of a generally semispherical configuration. The valve head also includes a reduced diameter portion terminating in an end surface 124 centrally intersected by the valve head bore. A headed pin 126 extends through the valve head bore such that the head 128 engages the valve end 124. The other end of the pin 126 is provided with a hole 130 through which end 132 of the tension spring 134 may be inserted. The tension spring 134 extends through the bore 136 of the fitting 108 and the other spring end 138 passes about a pin 140 received within a recess 142 defined in head 112 concentric to bore 136. In this manner the pin 140 diametrically extends across the fitting bore 136. The length of the spring 134 is such that when the components are assembled, as shown in FIG. 1, the spring tension maintains the valve head 120 in firm engagement with the seat 118 defined on the stem. Thus, pressurized air or fluid within the housing chamber 12 cannot pass into the fitting 108. Upon attaching a hose, not shown, to the fitting 108 and introducing pressurized water into the bore 136, which is of a greater pressure than the pressure existing within the body 10, the valve head 120 will be lifted from the seat 118 permitting the water to enter the body chamber. The convex configuration of the valve head 120 tends to center the valve body upon the stem 110 and maintain the check valve components in proper alignment with the stem and the bore 136. It will be readily appreciated that the components of the check valve may be very economically manufactured and as the support and mounting of the check valve structure comprises the fitting 108, itself, there is no need to machine or shape the fitting body 10 to provide for this check valve. As no closely fitting guide elements or spiders are utilized, reliable check valve operation will be provided over a long period of time even if the fitting 108 is used only infrequently.

When the camper, travel trailer, etc., having the water pressure system with which the inlet of the invention is utilized, is located where a pressurized water supply is not available, refilling of the water system must be done manually by removing the cap 28 and pouring water directly into the body chamber 12 through the body inlet. As the chamber is inclined upwardly and away from the adjacent mounting wall 20, such manual filling of the water system may be easily accomplished. The angle at which the body outlet is disposed also causes the cap and gauge to be oriented in a manner and at an angle which permits the gauge to be easily read.

It is appreciated that various modifications and changes to the invention may be apparent to those skilled in the art without departing from the spirit and scope thereof, and it is intended that the invention be defined only by the scope of the following claims.

I claim:

1. An inlet fitting for a pressurized fluid system comprising, in combination,
   (a) a hollow body having an inlet and an outlet,
   (b) a removable cap member adapted to selectively seal said body inlet, said cap member being of an elongated configuration having an axis and including a first axially extending portion adapted to be received within said body inlet and a second axially extending portion extending outwardly from said inlet when said cap member is received therein defining an exteriorly accessible portion,
   (c) a first end surface defined on said cap member transversely disposed to said axis and defining the end of said first portion, a second end surface defined on said cap member transversely disposed to said axis and defining the end of said second portion,
   (d) an inwardly extending, cylindrical wall surface formed in said cap member concentric to said cap member axis and intersecting said second end surface to form an annular outer edge,
   (e) a bottom surface defined in said cap member transversely disposed to said axis and intermediate said first and second end surfaces and intersecting said cylindrical wall whereby said cylindrical wall and bottom surface define a recess in said cap member,
   (f) a pressure gauge including a cylindrical body having an axis, a pressure-indicating indicia face perpendicularly disposed to said gauge axis, a transparent window disposed adjacent to said face, an indicating needle movable in a plane parallel to said indicia face and a gauge mounting stem having a passage defined therein concentrically related to said gauge axis, said gauge body being of a diameter slightly less than the diameter of said recess whereby said gauge body substantially shields said recess from view and said gauge and cap member form a substantially unitary appearance and of such axial length that a significant portion of said gauge body may be received within said recess, and
   (g) means affixing said gauge stem within said cap member recess whereby the axes of said cap member and gauge coincide, said stem passage extending through said bottom surface and said first end surface, said gauge face being substantially parallel to said cap member annular edge and a significant portion of said gauge body being received within said recess whereby said second cap member axial portion protects said gauge and said gauge face is readily visible when viewed in the direction of said cap member body axis toward said second portion.

2. In an inlet fitting as in claim 1 wherein:
   (a) said cap outer edge lies within a plane and said gauge pressure-indicating face is substantially planar, the plane of said gauge face being substantially parallel to the plane of said cap outer edge and said gauge window is located adjacent said cap outer edge.

3. In an inlet fitting as in claim 1 wherein:
   (a) threads are defined upon said cap first axially extending portion, and
   (b) a plurality of radially extending projections are defined on said cap second axially extending portion for facilitating manual rotation of said cap.

4. A cap for an inlet fitting for a pressurized fluid system comprising, in combination,
   (a) a cap body member of elongated configuration having an axis and including a first axially extending portion and a second axially extending portion,
   (b) cap mounting means defined on said first axially extending portion,
   (c) a first end surface defined on said cap member transversely disposed to said axis and defining the end of said first portion, a second end surface defined on said cap member transversely disposed to said axis and defining the end of said second portion,
   (d) an inwardly extending, cylindrical wall surface formed in said cap member concentric to said cap member axis and intersecting said second end surface to form an annular outer edge,
   (e) a bottom surface defined in said cap member transversely disposed to said axis and intermediate said first and second end surfaces and intersecting said cylindrical wall whereby said cylindrical wall and bottom surface define a recess in said cap member,
   (f) a pressure gauge including a cylindrical body having an axis, a pressure-indicating indicia face perpendicularly disposed to said gauge axis, a transparent window disposed adjacent to said face, an indicating needle movable in a plane parallel to said indicia face and a gauge mounting stem having a passage defined therein concentrically related to said gauge axis, said gauge body being of a diameter slightly less than the diameter of said recess whereby said gauge body substantially shields said recess from view and said gauge and cap body form a substantially unitary appearance and of such axial length that a significant portion of said gauge body may be received within said recess, and
   (g) means affixing said gauge stem within said cap member recess whereby the axes of said cap member and gauge coincide, said stem passage extending through said bottom surface and said first end surface, said gauge face being substantially parallel to said cap member annular edge and a significant portion of said gauge body being received within said recess whereby said second cap member axial portion protects said gauge and said gauge face is readily visible when viewed in the direction of said cap member body axis toward said second portion.

5. In a cap for an inlet fitting as in claim 4 wherein:
   (a) said cap mounting means comprises threads defined on said first axially extending portion, and
   (b) a plurality of radially extending projections are defined on said cap second axially extending portion for facilitating manual rotation of said cap.

6. An inlet fitting for a pressurized fluid system comprising, in combination,
   (a) a hollow body having an inlet and an outlet,
   (b) a removable cap member adapted to selectively seal said body inlet, said cap member being of an elongated configuration having an axis and including a first axially extending portion adapted to be received within said body inlet and a second axially extending portion extending outwardly from said inlet when said cap member is received therein defining an exteriorly accessible portion, (c) a first end surface defined on said cap member transversely disposed to said axis and defining the end of said first portion, a second end surface defined on said cap member transversely disposed to said axis and defining the end of said second portion, (d) an inwardly extending, cylindrical wall surface formed in said cap member concentric to said cap member axis and intersecting said second end surface to form an annular outer edge, (e) a bottom surface defined in said cap member transversely disposed to said axis and intermediate said first and second end surfaces and intersecting said cylindrical wall whereby said cylindrical wall and bottom surface define a recess in said cap member, (f) a pressure gauge including a cylindrical body having an axis, a pressure-indicating indicia face perpendicularly disposed to said gauge axis, a transparent window disposed adjacent to said face, an indicating needle movable in a plane parallel to said indicia face and a gauge mounting stem having a passage defined therein concentrically related to said gauge axis, said gauge body being of a diameter slightly less than the diameter of said recess whereby said gauge body substantially shields said recess from view and said gauge and cap member form a substantially unitary appearance and of such axial length that a significant portion of said gauge body may be received within said recess, (g) means affixing said gauge stem within said cap member recess whereby the axis of said cap member and gauge coincide, said stem passage extending through said bottom surface and said first end surface, said gauge face being substantially parallel to said cap member annular edge and a significant portion of said gauge body being received within said recess whereby said second cap member axial portion protects said gauge and said gauge face is readily visible when viewed in the direction of said cap member body axis toward said second portion, (h) a hole defined in said cap intersecting said cap bottom surface and said cap first end surface, said hole being disposed adjacent said gauge stem within the axial projection of said gauge body and thereby hidden from view by said gauge body, (i) a valve seat defined in said cap bottom surface concentric to said cap hole, (j) an annular spring guide defined on and extending from said cap first end surface concentric to said cap hole, (k) a threaded stem extending through said cap hole, a head defined on said stem disposed adjacent said valve seat and adapted to sealingly engage said seat, said stem having a diameter substantially less than the diameter of said cap hole, (l) a threaded spring retainer threaded on said stem, and (m) a compression spring interposed between said spring retainer and said cap first end surface, said spring being received within said spring guide.

References Cited

UNITED STATES PATENTS

| | | | |
|---|---|---|---|
| 1,781,359 | 11/1930 | Alland | 137—584 |
| 2,602,168 | 7/1952 | Lally | 137—584 X |
| 1,519,413 | 12/1924 | Murphy | 137—557 |
| 2,623,540 | 12/1952 | Palermo | 137—537 X |
| 2,756,106 | 7/1956 | Schenk | 137—537 X |
| 3,090,410 | 5/1963 | Klingler | 137—588 X |
| 3,259,144 | 7/1966 | Taplin | 137—557 X |

ALAN COHAN, *Primary Examiner.*